United States Patent [19]

Vanderveen et al.

[11] 4,102,967
[45] Jul. 25, 1978

[54] PELLETING OF CARBON BLACK

[75] Inventors: John W. Vanderveen; Harold R. Hunt, both of Bartlesville, Okla.

[73] Assignee: Phillips Petroleum Company, Bartlesville, Okla.

[21] Appl. No.: 713,073

[22] Filed: Aug. 9, 1976

[51] Int. Cl.² .............................................. B01J 2/10
[52] U.S. Cl. .................................... 264/113; 264/117
[58] Field of Search ............................... 264/117, 113

[56] References Cited

U.S. PATENT DOCUMENTS

| 2,639,225 | 5/1953 | Venuto | 23/314 |
|---|---|---|---|
| 2,850,403 | 9/1958 | Day | 106/307 |
| 3,391,234 | 7/1968 | Walenciak et al. | 264/117 |
| 3,459,844 | 8/1969 | Cole | 264/117 |
| 3,956,445 | 5/1976 | Hunt | 264/117 |
| 3,969,457 | 7/1976 | Paris | 264/117 |

Primary Examiner—Robert F. White
Assistant Examiner—J. R. Hall

[57] ABSTRACT

Carbon black is pelleted by combining loose carbon black with an aqueous pelleting liquid and agitating the mixture. Additional loose carbon black is added in a series of increments, followed by additional aqueous pelleting liquid containing an additive such as ammonium lignin sulfonate. The process produces layered pellets having a hardened outer shell. In another embodiment, an oil is added following the incremental addition of the loose carbon black in order to produce pellets which have a dust-free surface.

9 Claims, 1 Drawing Figure

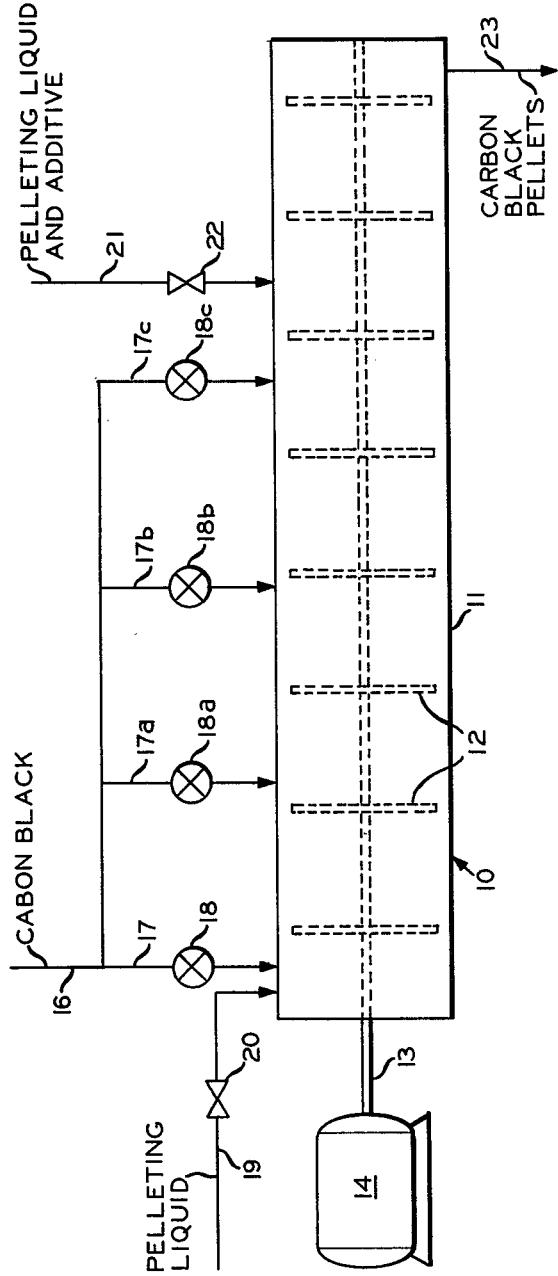

PELLETING OF CARBON BLACK

It is common practice in the carbon black industry to form loose carbon black into pellets. This increases the density of the black and provides a product which can be handled and transported more readily. One well-known procedure for producing carbon black pellets involves combining loose carbon black and an aqueous pelleting liquid in a pellet mill which contains an agitating means such as a series of rotating pins. As described in U.S. Pat. No. 3,956,445, it has recently been found that layered pellets of relatively high density can be produced by a process in which an aqueous pelleting liquid and loose carbon black are first combined. The resulting mixture is agitated, such as in a pellet mill, to form pellets. Additional carbon black is added in a series of increments, and additional water is finally added. By controlling the relative amounts of carbon black and pelleting liquid and the time of addition of increments of carbon black, layered pellets can be formed.

In accordance with a first embodiment of the present invention, it has been found that layered pellets having a hardened outer shell can be produced using the process of U.S. Pat. No. 3,956,445 and incorporating an additive, such as ammonium lignin sulfonate, in the final pelleting liquid. The additive is one which serves to increase the hardness of the resulting layered pellets. In accordance with another embodiment of this invention, dust-free, relatively soft pellets with low oil content can be produced when an oil is added to the final step of the pelleting process.

The accompanying drawing is a schematic representation of apparatus which can be employed to carry out the processes of this invention.

Referring now to the drawing in detail, there is shown a pellet mill 10 which comprises a cylindrical shell 11 having pellet agitating means disposed therein. The pellet agitating means can comprise a series of pins 12 which are mounted on a rotatable shaft 13. Shaft 13 is driven by a motor 14. Pellet mills of this type are well known in the art and are described in U.S. Pat. No. 3,674,437, for example.

Loose carbon black to be pelleted is introduced through a conduit 16. A conduit 17, which has a flow control means such as a star valve 18 therein, extends between conduit 16 and the inlet end of pellet mill 10. Additional conduits 17a, 17b and 17c, having respective star valves 18a, 18b and 18c therein, extend between conduit 16 and the pellet mill at locations spaced between the inlet and the outlet ends. A pelleting liquid, such as water, is introduced into the inlet end of the pellet mill through a conduit 19 which has a control valve 20 therein. Additional pelleting liquid containing an additive to be described hereinafter is introduced at a region downstream from conduit 17c through a conduit 21 which has a control valve 22 therein. Carbon black pellets are removed from the outlet end of the mill through a conduit 23 and passed to conventional drying equipment.

In order to produce the layered, hardened outer shell pellets of this invention, aqueous pelleting liquid and carbon black are introduced through respective conduits 19 and 17 in a weight ratio of liquid to black of about 2:3 to 2:1. Additional carbon black is introduced through conduits 17a, 17b and 17c. These conduits are spaced with respect to one another so that the average residence time of the carbon black pellets moving through the mill is at least 1 minute between adjacent inlet conduits. The amount of loose carbon black added through conduits 17a, 17b and 17c is such that each incremental addition comprises about 10 to 50 percent by weight of the carbon black added through conduit 17 per unit time, and the total amount of carbon black added in such incremental additions is in the range of about 50 to 150, preferably 75 to 125, percent by weight of the black added through conduit 17 per unit time.

The aqueous pelleting liquid added through conduit 21 is in an amount within the range of about 5 to 50 percent by weight of the pelleting liquid added through conduit 19 per unit time. Conduit 21 should be located upstream from the end of the pelleter a sufficient distance that some agitation of the pellets occurs between this introductory point and outlet conduit 23.

While the invention has been shown in conjunction with a conventional continuous pellet mill and the relative addition rates are specified in terms of unit time, the invention can also be practiced in a batch mill with incremental addition of the carbon black and pelleting liquid in the ratios as set forth above. In this case, the average residence times refer to the times between additions of black.

In a first embodiment of this invention, the additive incorporated in the final pelleting liquid is a material which serves to harden the outer surface of the pellets. This material can be a carbohydrate of the type disclosed in U.S. Pat. No. 2,850,403. Such carbohydrates include sugar, molasses, soluble starch, saccharides and carbohydrate-like extracts such as lignin extracts. The additive can also be a surface active agent such as those described in U.S. Pat. Nos. 2,639,225; 3,565,658; 3,645,765 and 3,844,809, for example. Ammonium lignin sulfonate is a particularly useful additive. The amount of additive employed is generally in the range of about 0.02 to 0.5 weight percent of the total carbon black employed.

In a second embodiment of this invention, the final pelleting liquid can be a hydrocarbon oil or an emulsion of such an oil with water. This produces substantially dust-free pellets. The amount of oil used is in the same range as the additive mentioned above. When the pellets are to be employed in an oil-extended rubber, the oil used can advantageously be the same as the extender oil.

The data set forth in U.S. Pat. No. 3,956,445 demonstrate that layered pellets can be produced when carbon black and pelleting liquid are combined in the manner set forth above. In order to demonstrate that layered pellets of greater hardness are obtained when an additive is included in the final pelleting liquid, two runs were conducted to produce layered pellets. In the first of these runs (Run 1), 3 pounds (1.6 kg) of loose N-220 carbon black and 4.5 pounds (2.04 kg) of water were added initially to a batch pelleter. This was a laboratory size unit of the general configuration of the pelleter illustrated in the drawing. The pelleter was operated at a speed of 690 revolutions per minute. Three 1-pound (0.45 kg) increments of loose (flocculent) carbon black were added at 5-minute intervals followed by four ¼-pound (0.11 kg) increments of water containing 1 weight percent ammonium lignin sulfonate. The total pelleting time was about 60 minutes. This relatively long mixing time was selected to insure uniform blending. A control run (Run 2) was carried out in the same manner except that no ammonium lignin sulfonate was employed in the final water additions. The resulting pellets had the following properties:

|  | Run No. | |
|---|---|---|
|  | 1 | 2 |
| Bulk density (lb./ft.³) | 25.3 | 25.2 |
| Size Distribution | | |
| Screen[a] #10 | 0 | 0 |
| #18 | 10.6 | 3.3 |
| #35 | 64.6 | 84.3 |
| #60 | 17.2 | 10.3 |
| #120 | 5.8 | 1.8 |
| Pan | 2.4 | 0.8 |
| Hardness[b] | 85 | 79 |

[a]ASTM D-1511-60 (using ASTM E-11 screens).
[b]A relative hardness test on 16 to 18 mesh pellets; a higher number indicates a greater force required to crush the pellets. The value of 85 corresponds to a force of about 14.5 grams required to crush a pellet; and the value of 79 corresponds to a force of about 11 grams.

It can be seen that the pellets produced by use of the ammonium lignin sulfonate were harder than the ones produced without this additive. Both sets of pellets demonstrated a shell structure when broken and viewed under a microscope.

It has been found that carbon black pellets containing ammonium lignin sulfonate and produced by conventional pelleting procedures exhibit a low weight loss in fluidized attrition tests. However, the sulfonate tends to cause some dispersion problems when the carbon black is mixed with rubber. By producing layered pellets in accordance with this invention, less sulfonate is required because it is used only in the outer layer. This reduces dispersion problems as well as dusting problems in handling pellets. If desired, oil or an aromatic solvent can be added to the initial pelleting liquid to produce pellets with a soft core.

While this invention has been described in conjunction with presently preferred embodiments, it obviously is not limited thereto.

What is claimed is:

1. A method of pelleting carbon black which comprises:
   (a) introducing an aqueous pelleting liquid and loose carbon black in a weight ratio of about 2:3 to about 2:1, respectively, into one end of an elongated continuous pellet mill having agitating means disposed between the said one end and a second end of the mill;
   (b) actuating said agitating means to mix said liquid and carbon black to form pellets and to move said pellets toward the second end of the mill;
   (c) introducing additional loose carbon black into the mill through at least one inlet positioned between said one end and said second end so that the average residence time of the pellets between said one end and the inlet is at least one minute, the amount of carbon black introduced through each of said at least one inlet being about 10 to about 50 percent by weight of the carbon black introduced into said one end and the total amount of carbon black introduced through said at least one inlet being in the range of about 50 to about 150 percent by weight of the carbon black introduced into said one end;
   (d) introducing additional liquid into said mill between the last inlet and said second end of the mill, said additional liquid being selected from the group consisting of (1) a aqueous liquid containing a carbohydrate, a surface active agent or a hydrocarbon oil and (2) a hydrocarbon oil, the amount of additional liquid so added being in the range of about 5 to about 50 percent by weight of the amount of liquid introduced into said one end, the amount of carbohydrate, surface active agent or hydrocarbon oil being in the range of about 0.02 to about 0.5 weight percent of the total amount of carbon black introduced into the mill, and the location at which the additional liquid is added being spaced from said second end of the mill so that agitation is imparted to the pellets after the additional liquid is added, thereby forming layered pellets containing the additional liquid substantially only in an outer layer of the layered pellets; and
   (e) removing said layered pellets from the second end of the mill.

2. A method of claim 1 wherein said additional liquid is water containing ammonium lignin sulfonate.

3. A method of claim 2 wherein the ammonium lignin sulfonate comprises about 1 weight percent of the water in which it is contained.

4. A method of claim 1 wherein said additional liquid is a hydrocarbon oil.

5. A method of pelleting carbon black which comprises:
   (a) combining an aqueous pelleting liquid and loose carbon black in the weight ratio of about 2:3 to about 2:1, respectively, and agitating the mixture in a batch mill to form pellets;
   (b) adding additional loose carbon black to the material resulting from step (a) in a series of increments and agitating the resulting mixture to continue to form layered pellets, there being a time interval of at least 1 minute between additions, the amount of carbon black added in each increment being about 10 to about 15 percent by weight of the carbon black initially combined with the pelleting liquid, and the total amount of carbon black added in said increments being in the range of about 50 to about 150 percent by weight of the carbon black initially combined with pelleting liquid;
   (c) adding additional liquid to the material resulting from step (b) in an amount in the range of about 5 to about 50 percent by weight of the amount of pelleting liquid initially combined with the carbon black, said additional liquid being selected from the group consisting of (1) an aqueous liquid containing a carbohydrate, a surface active agent or a hydrocarbon oil and (2) a hydrocarbon oil; and
   (d) agitating the resulting mixture to continue to form layered pellets containing the additional liquid substantially only in an outer layer of the layered pellets.

6. A method of claim 5 wherein said additional liquid is water containing ammonium lignin sulfonate.

7. A method of claim 6 wherein the ammonium lignin sulfonate comprises about 1 weight percent of the water in which it is contained.

8. A method of claim 5 wherein said additional liquid is a hydrocarbon oil.

9. A method of claim 1 wherein said additional loose carbon black is introduced into the mill through a plurality of said inlets which are spaced along the length of the mill so that the average residence time of the pellets between said one end and the first of said plurality of inlets and the average residence time between immediately adjacent pairs of said plurality of inlets is at least 1 minute, the amount of carbon black introduced through each of said plurality of inlets being about 10 to about 50 percent by weight of the carbon black introduced into said one end and the total amount of carbon black introduced through said plurality of inlets being in the range of about 50 to about 150 percent by weight of the carbon black introduced into said one end.

* * * * *